United States Patent
Takakubo

(10) Patent No.: US 7,042,607 B2
(45) Date of Patent: May 9, 2006

(54) SCANNING OPTICAL SYSTEM

(75) Inventor: Yutaka Takakubo, Saitama-ken (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 11/188,869

(22) Filed: Jul. 26, 2005

(65) Prior Publication Data
US 2006/0023971 A1    Feb. 2, 2006

(30) Foreign Application Priority Data
Jul. 27, 2004    (JP)    ............... 2004-218407

(51) Int. Cl.
G02B 26/08    (2006.01)
(52) U.S. Cl. .................... 359/205; 347/261
(58) Field of Classification Search .............. None
See application file for complete search history.

(56) References Cited

U.S. PATENT DOCUMENTS

| | | | |
|---|---|---|---|
| 5,739,940 A | 4/1998 | Kondo | |
| 6,067,106 A | 5/2000 | Ishibe et al. | |
| 6,115,164 A | 9/2000 | Kamikubo | |
| 6,124,962 A | 9/2000 | Kamikubo | |
| 6,222,662 B1 * | 4/2001 | Suzuki et al. ............ | 359/205 |
| 6,259,547 B1 | 7/2001 | Kamikubo | |
| 6,404,530 B1 | 6/2002 | Takeuchi | |
| 6,717,705 B1 | 4/2004 | Takakubo | |
| 6,831,763 B1 | 12/2004 | Takakubo | |
| 6,937,376 B1 | 8/2005 | Takakubo | |
| 6,954,296 B1 | 10/2005 | Takakubo | |

FOREIGN PATENT DOCUMENTS

| | | |
|---|---|---|
| JP | 9-105877 | 4/1997 |
| JP | 10-197820 | 7/1998 |
| JP | 10-333070 | 12/1998 |
| JP | 11-84290 | 3/1999 |
| JP | 11-95145 | 4/1999 |
| JP | 2000-131633 | 5/2000 |
| JP | 2001-125025 | 5/2001 |

OTHER PUBLICATIONS

English Language Abstract of JP 9-105877.
English Language Abstract of JP 10-197820.
English Language Abstract of JP 10-333070.
English Language Abstract of JP 11-95145.
English Language Abstract of JP 2001-125025.

* cited by examiner

Primary Examiner—Euncha P. Cherry
(74) Attorney, Agent, or Firm—Greenblum & Bernstein, P.L.C.

(57) ABSTRACT

A scanning optical system comprises: a light source which emits a beam of light; a deflecting system that dynamically deflects the beam emitted by the light source with its deflecting surface; and a scan lens group including a molded resin lens, which focuses the beam dynamically deflected and scanned in a main scanning direction by the deflecting system on an image formation surface. In the scanning optical system, the molded resin lens has a diffracting lens surface which is provided with a diffractive level difference structure formed on a base curve having refractive power, and a following condition is satisfied:

$$18 < WL/P < 28$$

where "W" denotes an effective scan width (mm) on the image formation surface, "L" denotes a distance (mm) from the deflecting surface to the molded resin lens, and "P" denotes a distance (mm) from the deflecting surface to the image formation surface.

8 Claims, 4 Drawing Sheets

SCANNING OPTICAL SYSTEM

INCORPORATION BY REFERENCE

This application claims priority of Japanese Patent Application No. 2004-218407, filed on Jul. 27, 2004, the entire subject matter of the application being incorporated herein by reference.

BACKGROUND OF THE INVENTION

The present invention relates to a scanning optical system used for an image formation device such as a laser printer.

In a scanning optical system, a beam of light emitted by a light source such as a laser diode is dynamically deflected (scanned) by a deflecting system such as a polygon mirror, and the beam scanned by the deflecting system is focused by a scan lens group such as an fθ lens to form a spot on an image formation surface of a photosensitive drum, etc. The spot which is scanned in a main scanning direction repetitively on the image formation surface successively forms a scan line on the image formation surface. Therefore, with the scanning optical system, by moving the image formation surface relative to the scanning optical scanning system at a constant speed in an auxiliary scanning direction (orthogonal to the main scanning direction) and on/off modulating the laser beam in sync with the scanning operation, a two-dimensional electrostatic latent image is formed on the image formation surface.

The scan lens group of the scanning optical system does not have a function of correcting chromatic aberration since the scan lens group is generally designed assuming the use of a beam of a single wavelength. Therefore, if the oscillation wavelength of the laser diode changes (due to individual differences, changes in the temperature and the output level, etc.), the length of each scan line formed on the image formation surface fluctuates due to chromatic aberration of magnification of the scan lens group, by which the precision of image formation is deteriorated.

In order to eliminate the effect of the chromatic aberration of magnification of the scan lens group, some configurations, employing a diffractive level difference structure (like a Fresnel lens) formed on a lens surface of a refractive lens of the scan lens group, have been disclosed in Japanese Patent Provisional Publication No.HEI10-197820 (hereinafter referred to as a "document #1"), Japanese Patent Provisional Publication No.HEI11-95145 (hereinafter referred to as a "document #2"), and Japanese Patent Provisional Publication No.2001-125025 (hereinafter referred to as a "document #3").

An example of a manufacturing method of a long scan lens having such a diffractive level difference structure, employing injection molding of resin, has been described in the document #3. According to the document #3, the long scan lens having the diffractive level difference structure is manufactured by injection molding of resin by use of a mold having a gate 31 (for injecting the resin into the mold) at a central position in the main scanning direction so that there will be no blind spot for the flow of the resin injected into the mold (i.e. no part inside the mold where the flowing resin can not reach).

However, even if the gate for injecting the resin into the mold is provided at the central position of the mold as described in the document #3, when a long lens having a lens surface with the diffractive level difference structure is manufactured by the injection molding of resin, deformation (e.g., loss of shape, getting out of shape) of the diffractive level difference structure tends to occur. Specifically, as the resin inside the mold cools down and contracts, stress concentration occurs to each edge of the diffractive level difference structure. When the lens is removed from the mold and the stress is released, each edge of the diffractive level difference structure is deformed (i.e., loses its original shape). Since such stress concentration is caused by contraction of the resin toward the center of the mold, the stress concentration and the edge deformation (caused by the stress concentration) become more and more significant as the distance from the central position (the position of the optical axis) increases.

Due to such deformation of the edges, the diffractive level difference structure previously formed on the inner surface of the mold can not be transcribed correctly onto the lens surface, by which diffraction efficiency of the lens is deteriorated. Further, since the number (density) of annular zones of the diffractive level difference structure increases as the distance from the center of the lens increases (that is, the peripheral area of the lens has a larger number of edges than the central area of the lens), the effect of the edge deformation (the effect of the incorrect transcription of the diffractive level difference structure) on the optical performance of the lens is even more enhanced in the peripheral area of the lens, by which a drop in peripheral brightness is caused.

SUMMARY OF THE INVENTION

The present invention which has been made in consideration of the above problems is advantageous in that a scanning optical system employing a molded resin lens having a diffracting lens surface (on which the diffractive level difference structure is formed by injection molding of resin) can be provided while reducing the deterioration in the diffraction efficiency and the peripheral brightness caused by the deformation of the diffractive level difference structure due to the contraction of the resin in the injection molding process.

In accordance with an aspect of the present invention, there is provided a scanning optical system including: a light source which emits a beam of light; a deflecting system that dynamically deflects the beam emitted by the light source with its deflecting surface; and a scan lens group including a molded resin lens, which focuses the beam dynamically deflected and scanned in a main scanning direction by the deflecting system on an image formation surface. In the scanning optical system, the molded resin lens has a diffracting lens surface which is provided with a diffractive level difference structure formed on a base curve having refractive power, and a following condition is satisfied:

$$18 < WL/P < 28$$

where "W" denotes an effective scan width (mm) on the image formation surface, "L" denotes a distance (mm) from the deflecting surface to the molded resin lens, and "P" denotes a distance (mm) from the deflecting surface to the image formation surface.

By the above configuration, an effective diameter of the diffracting lens surface (through which the beam scanning a range (effective scan width) on the image formation surface passes) measured in the main scanning direction can be kept substantially within a range 18 mm–28 mm. By keeping the effective diameter of the diffracting lens surface below the upper limit, displacement of each part of the resin due to the thermal contraction in the injection molding process can be kept low and the stress concentration occurring to each edge of the diffractive level difference structure can be kept to a minimum, by which the deformation (loss of shape) of the diffractive level difference structure can be prevented from occurring and the deterioration in the diffraction efficiency and the peripheral brightness caused by the deformation of the diffractive level difference structure can be reduced. On the other hand, by keeping the effective diameter of the diffracting lens surface above the lower limit, the possibility of deterioration in the optical performance and an increase in error sensitivity can be eliminated.

As above, by the present invention, a scanning optical system employing a molded resin lens having a diffracting lens surface (on which the diffractive level difference structure is formed by the injection molding of resin) can be provided, while reducing the deterioration in the diffraction efficiency and the peripheral brightness caused by the deformation (loss of shape) of the diffractive level difference structure due to the contraction of the resin in the injection molding process.

Optionally, the scan lens group may includes two or more refractive lenses. In this case, the molded resin lens may be placed as one of the refractive lenses of the scan lens group closest to the deflecting system.

Still optionally, the molded resin lens may be formed by injection molding using a mold having a gate at a position corresponding to a center of the effective scan width on a surface of the molded resin lens, the beam not regularly passing through the surface of the molded resin lens.

Still optionally, the diffractive level difference structure may have optical properties for correcting chromatic aberration of magnification which is caused by wavelength variation of the beam emitted by the light source.

Still optionally, the base curve of the diffracting lens surface of the molded resin lens may be designed as a rotationally symmetric aspherical surface.

Still optionally, the scan lens group may include a first refractive lens which is placed on the deflecting system's side and a second refractive lens. In this case, the molded resin may be placed as the first refractive lens, and the diffracting lens surface with the diffractive level difference structure may be provided to a side of the molded resin lens facing toward the image formation surface.

In a particular case, a lens surface of the molded resin lens facing toward the deflecting system may be formed as a concave spherical surface, and the base curve of the diffracting lens surface of the molded resin lens facing toward the image formation surface may be designed as a convex rotationally symmetric aspherical surface. Further, a lens surface of the second refractive lens facing toward the deflecting system may be formed as a concave spherical surface, and a lens surface of the second refractive lens facing toward the image formation surface may be formed as a convex anamorphic aspherical surface.

Optionally, the deflecting system may be implemented by a polygon mirror.

BRIEF DESCRIPTION OF THE ACCOMPANYING DRAWINGS

The objects and features of the present invention will become more apparent from the consideration of the following detailed description taken in conjunction with the accompanying drawings, in which.

DETAILED DESCRIPTION OF THE EMBODIMENTS

Figure 1:
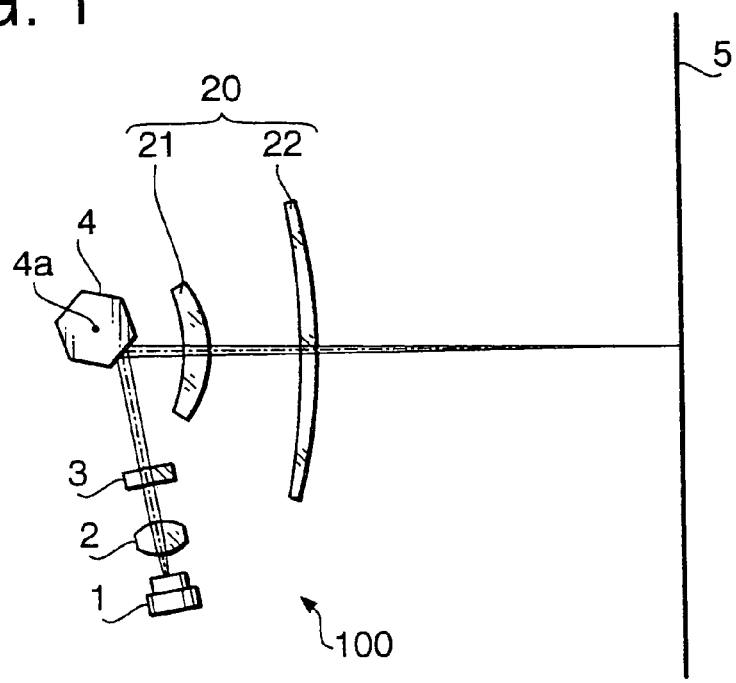
FIG. 1 is a schematic cross-sectional view showing the overall composition of a scanning optical system in accordance with an embodiment of the present invention.

Referring now to the drawings, a description will be given in detail of a preferred embodiment in accordance with the present invention.

FIG. 1 is a schematic cross-sectional view showing the overall composition of a scanning optical system 100 in accordance with an embodiment of the present invention.

The scanning optical system 100 shown in FIG. 1 is installed in a scanning unit of an image formation device such as a laser printer to be used for scanning a laser beam. The scanning optical system 100 includes a laser diode 1, a collimator lens 2, a cylindrical lens 3, a polygon mirror 4 as a deflecting system for dynamically deflecting the laser beam emitted by the laser diode 1, and an fθ lens 20 as a scan lens group for focusing the beam dynamically deflected by the polygon mirror 4 on an image formation surface 5.

In this specification, a direction of the scanning of the beam spot on the image formation surface 5 is defined as a "main scanning direction y", and a direction orthogonal to the main scanning direction y on the image formation surface 5 is defined as an "auxiliary scanning direction z". The configuration of each optical element, directions of power, etc. will be explained with respect to the directions on the image formation surface 5. Specifically, the main scanning direction can be defined not only on the image formation surface 5 but also at any point on the optical path of the laser beam, as a direction regarding the main scan of the laser beam, that is, the direction in which the laser beam is dynamically deflected by the polygon mirror 4 or the direction in which the laser beam moves according to the revolution of the polygon mirror 4. The auxiliary scanning direction can also be defined at any point on the optical path of the laser beam as a direction orthogonal to the main scanning direction. Further, a plane containing the optical axis of the fθ lens 20 and orthogonal to the main scanning direction y is defined as an "auxiliary scanning cross section", and a plane formed by the laser beam scanned in the main scanning direction y is defined as a "main scanning cross section".

The fθ lens 20 includes a first lens 21 (placed on the polygon mirror 4 side) and a second lens 22. The first lens 21 is a positive meniscus lens having a concave first surface facing the polygon mirror 4 and a second surface having diffractive level difference structure for correcting the chromatic aberration of magnification of the whole fθ lens 20. The second lens 22 is an anamorphic lens having strong positive power in the auxiliary scanning direction.

The laser beam emitted from the laser diode 1 and collimated by the collimator lens 2 into a collimated beam passes through the cylindrical lens 3 (having positive power in the auxiliary scanning direction), by which the laser beam is converged in the auxiliary scanning direction to form a line-like image in the vicinity of a mirror surface of the polygon mirror 4. The polygon mirror 4, driven and rotated around its rotation axis 4a, dynamically deflects (scans) the beam in the main scanning direction. The dynamically deflected beam finally reaches the image formation surface 5 via the first lens 21 and the second lens 22 of the fθ lens 20, forming a spot being scanned in the main scanning direction y.

Figure 6:
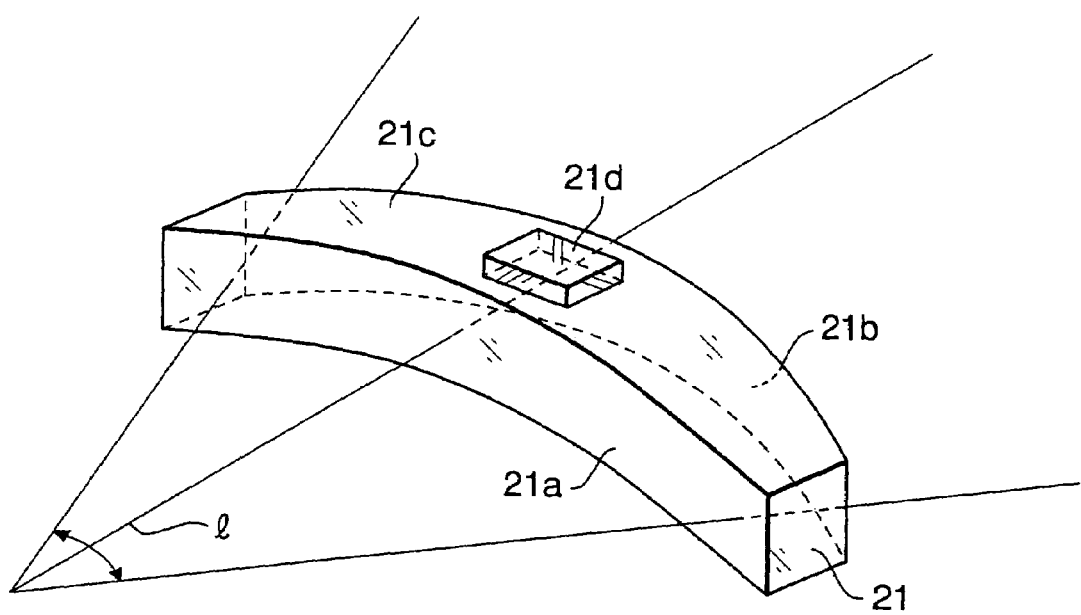
FIG. 6 is an enlarged perspective view showing a first lens of an fθ lens of the scanning optical system of the embodiment.
Figure 7A:
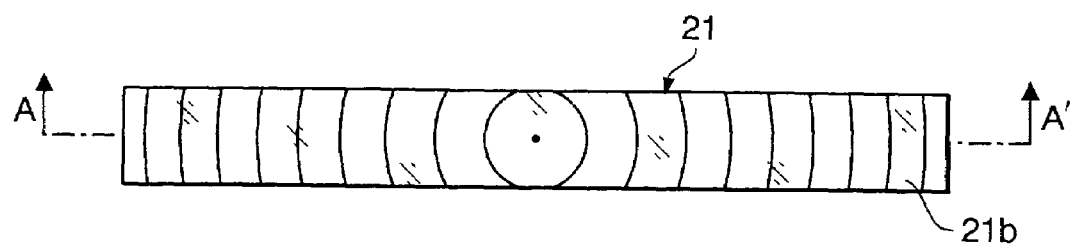
FIG. 7A is a conceptual illustration of a diffracting lens surface formed on an image formation surface side of the first lens.
Figure 7B:
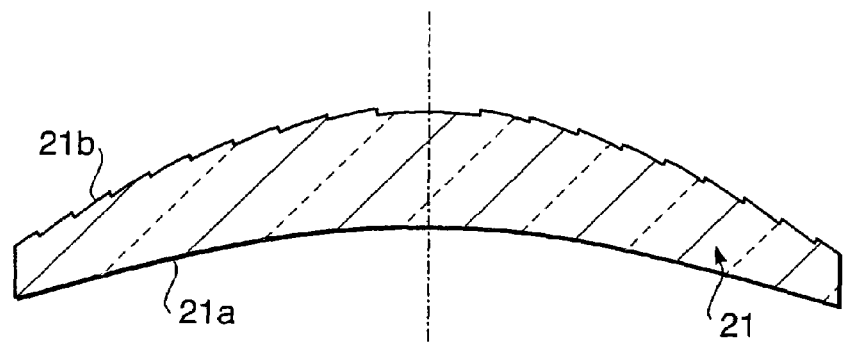
FIG. 7B is a cross-sectional view of the first lens along a line A–A' of FIG. 7A.

FIG. 6 is an enlarged perspective view of the first lens 21 of the fθ lens 20 seen from the polygon mirror 4 side. As shown in FIG. 6, the first lens 21 has a three-dimensional shape equivalent to one that is cut by two planes parallel to the main scanning cross section and two planes parallel to the auxiliary scanning cross section, to be in a rectangular shape (long in the main scanning direction) when viewed from the front. Hereafter, a surface 21c of the first lens 21 parallel to the main scanning cross section (functioning differently from a first surface 21a and a second surface 21b through which the beam passes regularly) is referred to as a "lateral surface". The second surface 21b is a diffracting lens surface having a diffractive level difference structure like a Fresnel lens (including a plurality of annular zones divided by small level differences) formed on a base curve having refractive power. The diffractive level difference structure is designed to cause positive power in the main scanning cross section in order to correct the chromatic aberration of magnification of the fθ lens 20 having positive refractive power. FIG. 7A is a conceptual illustration of the diffracting lens surface 21b formed on the image formation surface side of the first lens 21. FIG. 7B is a cross-sectional view of the first lens 21 along a line A–A' of FIG. 7A.

In order to form the diffractive level difference structure, the first lens 21 is manufactured by injection molding of plastic (resin). The mold used for the injection molding is provided with a gate at a position corresponding to the center of the lateral surface 21c (at the same position in the main scanning direction with the center 1 of effective scan width of the beam scanned by the polygon mirror 4). Therefore, a mark 21d (formed when a projection corresponding to the gate is cut off) remains at the center of the lateral surface 21c of the first lens 21 manufactured by use of the mold (at the same position in the main scanning direction with the center 1 of the effective scan width of the beam scanned by the polygon mirror 4). Various types of resin suitable for optical lenses, such as PMMA (polymethylmethacrylate), polycarbonate or ZEONEX®, can be used as the material of the first lens 21.

As the resin cools down in the manufacturing process of the first lens 21 using such a mold, stress concentration (due to thermal contraction) naturally occurs to each edge of the diffractive level difference structure. However, since the first lens 21 in this embodiment is placed as an optical element of the fθ lens 20 closest to the polygon mirror 4, the width of the first lens 21 in the main scanning direction can be set small, distances from the center (optical axis) of the first lens 21 to its periphery can be made relatively short, and the volume of the first lens 21 can be made small. Therefore, even when stress concentration occurs to edges of the diffractive level difference structure in the vicinity of the periphery of the first lens 21 due to thermal contraction, the stress concentration remains within a level causing no deformation (e.g., loss of shape, getting out of shape) of the diffractive level difference structure.

In order to prevent the deformation of the diffractive level difference structure as above, in this embodiment, the width (effective diameter) of the first lens 21 in the main scanning direction is set to satisfy the following condition (1):

$$18 < WL/P < 28 \tag{1}$$

where "W" denotes the effective scan width (mm) of the scanning optical system measured on the image formation surface 5, "L" denotes the distance (mm) from a reflecting surface of the polygon mirror 4 (deflecting surface) to the first surface 21a of the first lens 21, and "P" denotes the distance (mm) from the deflecting surface to the image formation surface 5. Since WL/P in the inequality (1) corresponds to the width (effective diameter) of the first lens 21 in the main scanning direction, WL/P smaller than the lower limit causes a deterioration in the optical performance and an increase in error sensitivity. On the other hand, WL/P larger than the upper limit (too long distance from the center (optical axis) to the periphery) causes the deformation (loss of shape) of the diffractive level difference structure (due to thermal contraction) in the vicinity of the periphery of the first lens 21, and consequently, the deterioration in the diffraction efficiency and the peripheral brightness.

Incidentally, since the gate for injecting the resin into the mold is placed at the center of the mold (corresponding to the position of the optical axis) in this embodiment, the resin injected from the gate flows inside the mold symmetrically from the center (i.e. the position of the gate or the optical axis). Therefore, incompleteness of the transcription of the mold configuration, caused by pressure difference and temperature difference between the front (nearer to the gate) and rear (farther from the gate) of each edge of the diffractive level difference structure when the resin advances climbing over each edge, occurs symmetrically with respect to the optical axis of the first lens 21, by which no deterioration of the diffraction efficiency is caused. On the other hand, if the gate is placed asymmetrically (at a position other than the center), the incompleteness of the mold configuration transcription occurs asymmetrically with respect to the optical axis, by which a peripheral brightness ratio (CCR (Center Corner Ratio)) becomes asymmetrical with respect to the optical axis and that might cause gradation in the print density.

Further, since the first lens 21 is processed by the flat cutting of the upper and lower lateral surfaces (on both sides in the auxiliary scanning direction) so that the lens 21 is formed as long lens in a rectangular shape to have a prescribed width only in the vicinity of the main scanning cross section when viewed from the front, the deformation (loss of shape) of the diffractive level difference structure in the auxiliary scanning direction has no significant effect.

In the following, some concrete examples of the scanning optical system 100 in accordance with the embodiment will be described in detail.

FIRST EXAMPLE

A scanning optical system as a first example of this embodiment is designed assuming that the wavelength of the laser beam emitted by the laser diode 1 is 780 nm. The focal length f of the fθ lens 20 regarding the main scanning direction is 150 mm, and the effective scan width W of the scanning optical system on the image formation surface is 216 mm. The polygon mirror 4 has six reflecting surfaces with an inscribed radius (the radius of the inscribed circle of the polygon) of 12.1 mm. The angle of the laser beam incident upon the polygon mirror 4 with respect to the optical axis of the fθ lens 20 is −80.0 degrees ("−"denotes the clockwise direction in FIG. 1).

The following Table 1 shows the configuration of each optical surface of the scanning optical system of the first example between the cylindrical lens 3 and the image formation surface 5. In the table, the symbol "R" denotes a curvature radius (mm) of each optical surface in the main scanning direction, "Rz" denotes a curvature radius (mm) of each optical surface in the auxiliary scanning direction (omitted for rotationally symmetric surfaces), "D" denotes the distance (mm) from the optical surface to the next optical surface measured on the optical axis, and "n" denotes the refractive index of a medium between the optical surface and the next optical surface at the design wavelength 780 nm and another wavelength 750 nm (omitted for air).

TABLE 1

| No. | R | Rz | D | n(780 nm) | n(750 nm) |
|---|---|---|---|---|---|
| #1 | ∞ | 33.20 | 4.00 | 1.5107 | 1.5107 |
| #2 | ∞ | | 62.36 | | |
| #3 | ∞ | | 18.00 | | |
| #4 | −60.000 | ← | 8.00 | 1.51922 | 1.51980 |
| #5 | −33.761 | ← | 29.00 | | |
| #6 | −241.045 | ← | 5.00 | 1.48617 | 1.48677 |
| #7 | −690.778 | −18.839 | 120.00 | | |
| #8 | ∞ | | 0.00 | | |

The optical surfaces shown in Table 1 (and in the following similar Tables) are numbered (No. 1–No. 8) in order of the propagation of the laser beam, in which the surface number "1" denotes the first surface of the cylindrical lens 3 (cylindrical surface), "2" denotes the second surface of the cylindrical lens 3 (plane surface), "3" denotes the deflecting surface (a reflecting surface of the polygon mirror 4), "4" denotes the first surface of the first lens 21 (concave spherical surface), "5" denotes the second surface of the first lens 21 (diffracting lens surface having the diffractive level difference structure formed on a base curve designed as a convex rotationally symmetric aspherical surface), "6" denotes the first surface of the second lens 22 (concave spherical surface), "7" denotes the second surface of the second lens 22 (anamorphic aspherical surface), and "8" denotes the image formation surface 5. Incidentally, the "anamorphic aspherical surface" means an aspherical surface whose shape on the main scanning cross section is defined by a function of the distance from the optical axis measured in the main scanning direction and whose shape on each plane parallel to the auxiliary scanning cross section is an arc with a curvature defined by a function of the distance from the optical axis measured in the main scanning direction.

The configuration of the rotationally symmetric aspherical surface (the base curve of the second surface of the first lens 21) is expressed by the following equation (2):

$$X(h) = \frac{Ch^2}{1+\sqrt{1-(1+\kappa)C^2h^2}} + A_4h^4 + A_6h^6 + A_8h^8 \quad (2)$$

where "X(h)" denotes a "SAG amount" of each point on the aspherical surface whose height (distance) from the optical axis is h (SAG amount: the distance from a tangential plane contacting the aspherical surface on the optical axis), "C" denotes the curvature (1/R) of the aspherical surface on the optical axis, "κ" denotes a conical coefficient, and "$A_4$", "$A_6$" and "$A_8$" denote aspherical coefficients of fourth, sixth and eighth orders.

Meanwhile, the configuration of the diffractive level difference structure of the second surface of the first lens 21 is defined by an optical path length increment ΔΦ(h) (relative to the base curve) at each point on the structure at a height h from the optical axis. The optical path length increment ΔΦ(h) is expressed by the following equation (3):

$$\Delta\Phi(h) = P_2h^2 + P_4h^4 + P_6h^6 + P_8h^8 \quad (3)$$

where $P_2$, $P_4$, $P_6$ and $P_8$ are optical path difference function coefficients of second, fourth, sixth and eighth orders.

The following Table 2 shows concrete examples of the conical coefficient κ and the aspherical coefficients $A_4$, $A_6$ and $A_8$ to be substituted into the equation (2) for specifying the configuration of the based curve of the surface No. 5 in Table 1 (the second surface of the first lens 21) and the optical path difference function coefficients $P_2$, $P_4$, $P_6$ and $P_8$ to be substituted into the equation (3) for specifying the configuration of the diffractive level difference structure.

TABLE 2

| κ | 0.00000E−00 | $P_2$ | −2.03822E−01 |
|---|---|---|---|
| $A_4$ | 3.71923E−06 | $P_4$ | 0.00000E+00 |
| $A_6$ | 5.46871E−10 | $P_6$ | 0.00000E+00 |
| $A_8$ | −1.40853E−13 | $P_8$ | 0.00000E+00 |

The sectional form of the anamorphic aspherical surface (the second surface of the second lens 22 (surface No. 7 in Table 1)) on the main scanning cross section is expressed by the following equation (4):

$$X(y) = \frac{Cy^2}{1+\sqrt{1-(1+\kappa)C^2y^2}} + \sum AM_n y^n \quad (4)$$

where "X(y)" denotes the SAG amount of each point on the aspherical surface (and on the main scanning cross section) whose height from the optical axis measured in the main scanning direction is y (SAG amount: the distance from a tangential plane contacting the aspherical surface on the optical axis), "C" denotes the curvature (1/R) of the aspherical surface in the main scanning direction measured on the optical axis, "κ" denotes a conical coefficient, and each "$AM_n$" denotes an aspherical coefficient of the n-th order for defining a curvature in the main scanning direction.

The sectional form of the anamorphic aspherical surface on each plane (at a height y in the main scanning direction from the optical axis) parallel to the auxiliary scanning cross section is expressed by the following equation (5):

$$Cz(y) = Cz + \Sigma AS_n y^n \quad (5)$$

where "Cz(y)" denotes the curvature of the aspherical surface on the plane (at the height y in the main scanning direction from the optical axis), "Cz" denotes the curvature (1/R) of the aspherical surface on the auxiliary scanning cross section, and each "$AS_n$" denotes an aspherical coefficient of the n-th order for defining the curvature Cz(y).

The following Table 3 shows concrete examples of the conical coefficient κ and the aspherical coefficients $AM_n$ and $AS_n$ to be substituted into the equations (4) and (5) for specifying the configuration of the surface No. 7 in Table 1 (the second surface of the second lens 22).

TABLE 3

| κ | 0.00E-00 | | |
|---|---|---|---|
| $AM_1$ | 0.0000E+00 | $AS_1$ | 1.60678E-05 |
| $AM_2$ | 0.0000E+00 | $AS_2$ | 8.40839E-06 |
| $AM_4$ | -1.72127E-06 | $AS_4$ | -7.05058E-09 |
| $AM_6$ | 6.06301E-10 | $AS_6$ | 2.90154E-12 |
| $AM_8$ | -2.46626E-13 | $AS_8$ | -5.66870E-16 |
| $AM_{10}$ | 6.96597E-17 | $AS_{10}$ | 0.0000E+00 |
| $AM_{12}$ | -1.05889E-20 | $AS_{12}$ | 0.0000E+00 |
| $AM_{14}$ | 5.38109E-25 | $AS_{14}$ | 0.0000E+00 |

Figure 2:
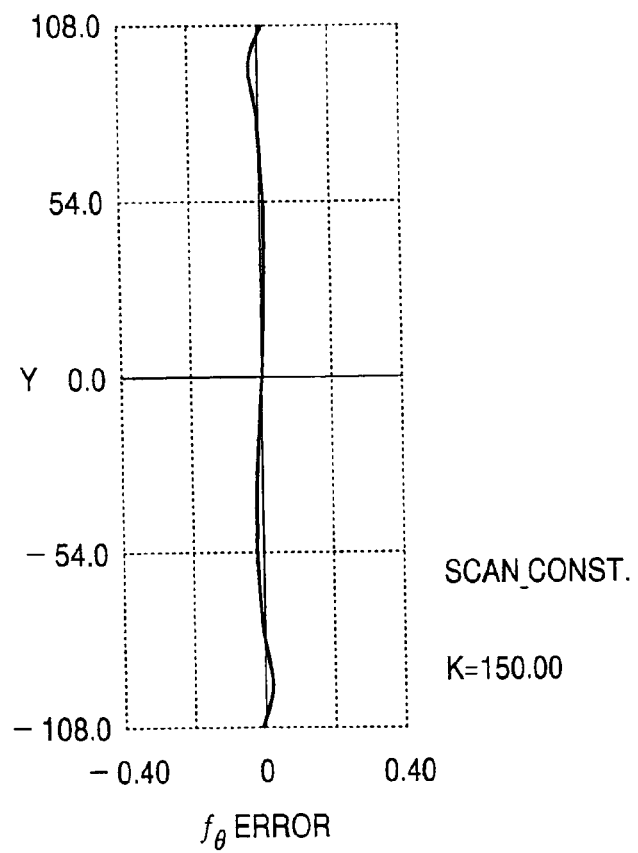
FIG. 2 is a graph showing an fθ error of the scanning optical system of the embodiment.
Figure 3:
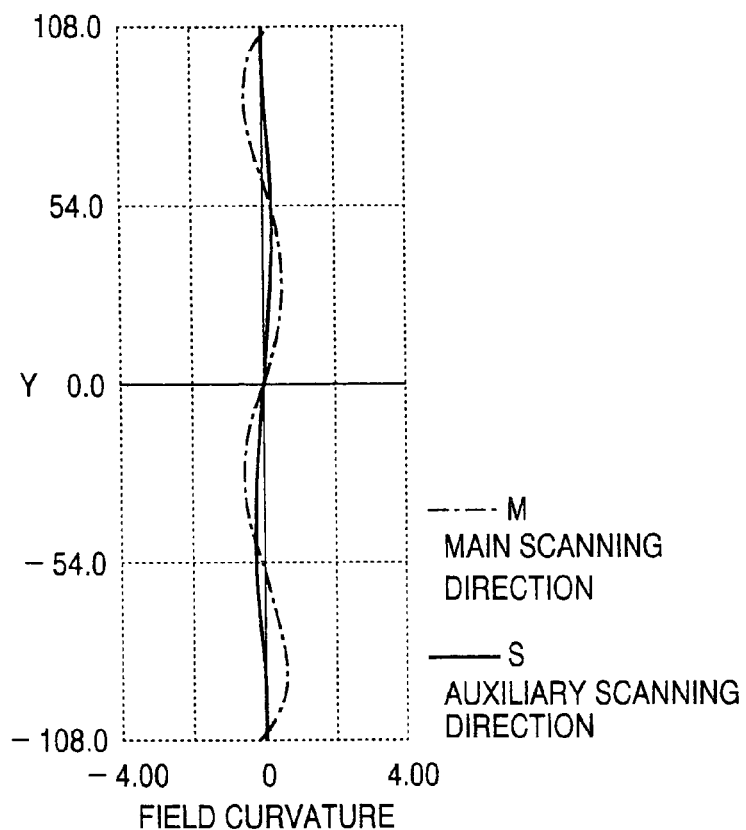
FIG. 3 is a graph showing field curvature of the scanning optical system of the embodiment.
Figure 4:
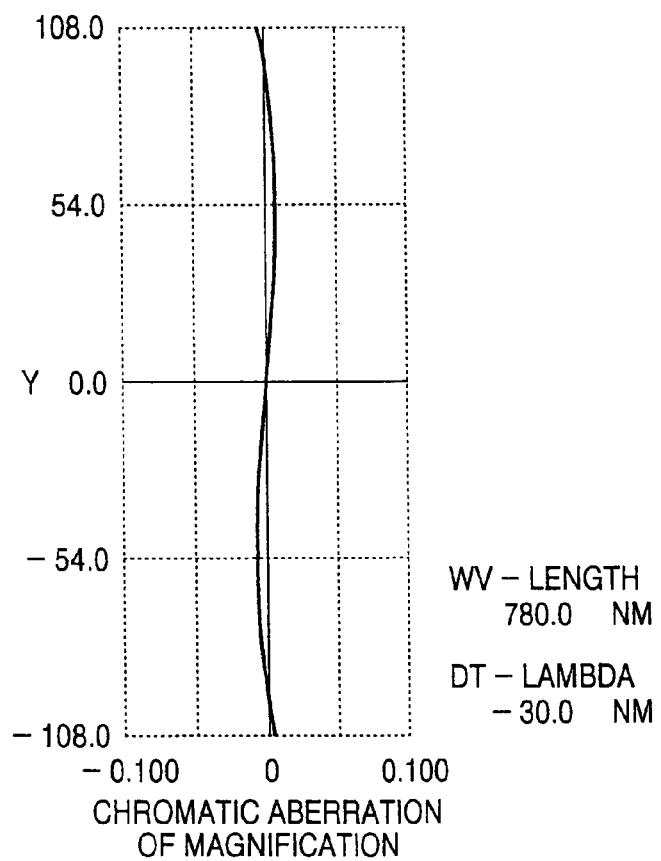
FIG. 4 is a graph showing chromatic aberration of magnification of the scanning optical system of the embodiment.

FIGS. 2 through 4 are graphs showing the optical performance of the scanning optical system configured specifically as above, in which FIG. 2 shows the fθ error (deviation of the position of the spot from an ideal position), FIG. 3 shows the field curvature (deviation of the focal position from the paraxial image surface (paraxial field) measured in the optical axis direction) in regard to the main scanning direction (broken line) and the auxiliary scanning direction (solid line), and FIG. 4 shows the chromatic aberration of magnification (deviation of the spot position (at a deviated wavelength 30 nm away from a reference wavelength) from a spot position at the reference wavelength). In each graph, the vertical axis represents image height (mm) (distance from the center of the paraxial image surface (intersecting with the optical axis) measured in the main scanning direction), and the horizontal axis represents the amount of each aberration (mm).

Figure 5:
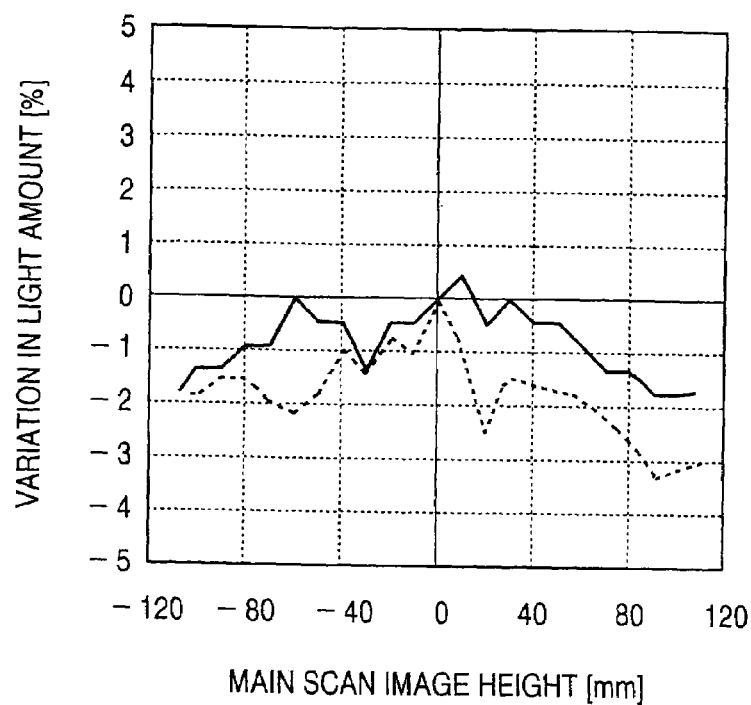
FIG. 5 is a graph showing brightness variation (in the main scanning direction) of the scanning optical system of the embodiment.

Incidentally, substituting W=216, L=18 and P=180 (obtained from the aforementioned values) into WL/P of the inequality (1) gives WL/P=21.6, which means that the scanning optical system of the first example satisfies the condition (1). As shown in FIG. 5, in the scanning optical system of this example satisfying the condition (1), the drop in the light amount (brightness variation) in the peripheral parts (the horizontal axis of the graph denotes main scan image height) becomes substantially symmetrical, differently from another scanning optical system (broken line) that does not satisfy the condition (1).

SECOND EXAMPLE

Similarly to the first example described above, a scanning optical system as a second example of this embodiment is designed assuming the wavelength 780 nm of the laser beam emitted by the laser diode 1. The focal length f of the fθ lens 20 regarding the main scanning direction is 150 mm, and the effective scan width W of the scanning optical system on the image formation surface is 216 mm. The polygon mirror 4 has six reflecting surfaces with an inscribed radius of 12.1 mm. The angle of the laser beam incident upon the polygon mirror 4 with respect to the optical axis of the fθ lens 20 is -80.0 degrees ("-"denotes the clockwise direction in FIG. 1).

The following Table 4 shows the configuration of each optical surface of the scanning optical system of the second example between the cylindrical lens 3 and the image formation surface 5. The meaning of each symbol in Table 4 is the same as that in Table 1.

TABLE 4

| No. | R | Rz | D | n(780 nm) | n(750 nm) |
|---|---|---|---|---|---|
| #1 | ∞ | 33.20 | 4.00 | 1.5107 | 1.5107 |
| #2 | ∞ | | 62.36 | | |
| #3 | ∞ | | 15.50 | | |
| #4 | -50.000 | ← | 7.00 | 1.51922 | 1.51980 |
| #5 | -31.486 | ← | 32.50 | | |
| #6 | -363.131 | ← | 5.00 | 1.48617 | 1.48677 |
| #7 | -517.624 | -18.926 | 120.00 | | |
| #8 | ∞ | | 0.00 | | |

The following Table 5 shows concrete examples of the conical coefficient κ and the aspherical coefficients $A_4$, $A_6$ and $A_8$ to be substituted into the equation (2) for specifying the configuration of the based curve of the surface No. 5 in Table 4 (the second surface of the first lens 21) and the optical path difference function coefficients $P_2$, $P_4$, $P_6$ and $P_8$ to be substituted into the equation (3) for specifying the configuration of the diffractive level difference structure.

TABLE 5

| κ | 0.00000E-00 | $P_2$ | -7.22026E-02 |
|---|---|---|---|
| $A_4$ | 4.65330E-06 | $P_4$ | -4.15991E-04 |
| $A_6$ | -2.99720E-10 | $P_6$ | 0.00000E+00 |
| $A_8$ | 7.36044E-13 | $P_8$ | 0.00000E+00 |

The following Table 6 shows concrete examples of the conical coefficient κ and the aspherical coefficients $AM_n$ and $AS_n$ to be substituted into the equations (4) and (5) for specifying the configuration of the surface No. 7 in Table 4 (the second surface of the second lens 22).

TABLE 6

| κ | 0.00E-00 | | |
|---|---|---|---|
| $AM_1$ | 0.0000E+00 | $AS_1$ | 1.54672E-05 |
| $AM_2$ | 0.0000E+00 | $AS_2$ | 8.42580E-06 |
| $AM_4$ | -1.44136E-06 | $AS_4$ | -6.26383E-09 |
| $AM_6$ | 5.39720E-10 | $AS_6$ | 2.53574E-12 |
| $AM_8$ | -2.44862E-13 | $AS_8$ | -4.86237E-16 |
| $AM_{10}$ | 8.19053E-17 | $AS_{10}$ | 0.0000E+00 |
| $AM_{12}$ | -1.83201E-20 | $AS_{12}$ | 0.0000E+00 |
| $AM_{14}$ | 1.77035E-24 | $AS_{14}$ | 0.0000E+00 |

Substituting W=216, L=15.5 and P=180 (obtained from the aforementioned values) into WL/P of the inequality (1) gives WL/P=18.6, which means that the scanning optical system of the second example satisfies the condition (1).

THIRD EXAMPLE

Similarly to the first and second examples described above, a scanning optical system as a third example of this embodiment is designed assuming the wavelength 780 nm of the laser beam emitted by the laser diode 1. The focal length f of the fθ lens 20 regarding the main scanning direction is 150 mm, and the effective scan width W of the scanning optical system on the image formation surface is 216 mm. The polygon mirror 4 has six reflecting surfaces with an inscribed radius of 12.1 mm. The angle of the laser beam incident upon the polygon mirror 4 with respect to the optical axis of the fθ lens 20 is -80.0 degrees ("-"denotes the clockwise direction in FIG. 1).

The following Table 7 shows the configuration of each optical surface of the scanning optical system of the third example between the cylindrical lens 3 and the image formation surface 5. The meaning of each symbol in Table 7 is the same as that in Table 1.

TABLE 7

| No. | R | Rz | D | n(780 nm) | n(750 nm) |
|---|---|---|---|---|---|
| #1 | ∞ | 33.20 | 4.00 | 1.5107 | 1.5107 |
| #2 | ∞ | | 62.36 | | |
| #3 | ∞ | | 23.00 | | |
| #4 | −70.000 | ← | 7.00 | 1.51922 | 1.51980 |
| #5 | −33.705 | ← | 25.00 | | |
| #6 | −182.736 | ← | 5.00 | 1.48617 | 1.48677 |
| #7 | −1151.015 | 19.061 | 120.00 | | |
| #8 | ∞ | | 0.00 | | |

As described above, by the embodiment in accordance with the present invention, a scanning optical system employing a molded resin lens having a diffracting lens surface (on which the diffractive level difference structure is formed by the injection molding of resin) can be provided, while reducing the deterioration in the diffraction efficiency and the peripheral brightness caused by the deformation (loss of shape) of the diffractive level difference structure due to the contraction of the resin in the injection molding process.

While a description has been given above of a preferred embodiment in accordance with the present invention, the present invention is not to be restricted by the particular illustrative embodiment and a variety of modifications, design changes, etc. are possible without departing from the scope and spirit of the present invention described in the appended claims.

While the deformation (loss of shape) of the diffractive level difference structure might occur to a peripheral area of the molded resin lens 21 outside the effective diameter of the diffracting lens surface, the beam scanned by the polygon mirror (within the effective scan width on the image formation surface) does not pass through the peripheral area of the molded resin lens outside the effective diameter. Therefore, the peripheral area of the molded resin lens 21 may either be cut off from the molded resin lens or left intact.

The following Table 8 shows concrete examples of the conical coefficient κ and the aspherical coefficients $A_4$, $A_6$ and $A_8$ to be substituted into the equation (2) for specifying the configuration of the based curve of the surface No. 5 in Table 7 (the second surface of the first lens 21) and the optical path difference function coefficients $P_2$, $P_4$, $P_6$ and $P_8$ to be substituted into the equation (3) for specifying the configuration of the diffractive level difference structure.

TABLE 8

| κ | 0.00000E−00 | $P_2$ | 0.00000E+00 |
|---|---|---|---|
| $A_4$ | 4.27576E−06 | $P_4$ | −2.78943E−04 |
| $A_6$ | 1.16692E−09 | $P_6$ | 0.00000E+00 |
| $A_8$ | 7.88096E−13 | $P_8$ | 0.00000E+00 |

The following Table 9 shows concrete examples of the conical coefficient κ and the aspherical coefficients $AM_n$ and $AS_n$ to be substituted into the equations (4) and (5) for specifying the configuration of the surface No. 7 in Table 7 (the second surface of the second lens 22).

TABLE 9

| κ | 0.00E−00 | | |
|---|---|---|---|
| $AM_1$ | 0.0000E+00 | $AS_1$ | 1.58037E−05 |
| $AM_2$ | 0.0000E+00 | $AS_2$ | 7.37034E−06 |
| $AM_4$ | −2.16690E−06 | $AS_4$ | −6.81709E−09 |
| $AM_6$ | 8.52259E−10 | $AS_6$ | 2.35247E−12 |
| $AM_8$ | −3.95761E−13 | $AS_8$ | −3.40277E−16 |
| $AM_{10}$ | 1.21436E−16 | $AS_{10}$ | 0.0000E+00 |
| $AM_{12}$ | −1.86397E−20 | $AS_{12}$ | 0.0000E+00 |
| $AM_{14}$ | 7.69603E−25 | $AS_{14}$ | 0.0000E+00 |

Substituting W=216, L=23 and P=180 (obtained from the aforementioned values) into WL/P of the inequality (1) gives WL/P=27.6, which means that the scanning optical system of the third example satisfies the condition (1).

What is claimed is:

1. A scanning optical system, comprising:
  a light source which emits a beam of light;
  a deflecting system that dynamically deflects the beam emitted by the light source with its deflecting surface; and
  a scan lens group including a molded resin lens, which focuses the beam dynamically deflected and scanned in a main scanning direction by the deflecting system on an image formation surface,
  wherein:
  the molded resin lens has a diffracting lens surface which is provided with a diffractive level difference structure formed on a base curve having refractive power; and
  a following condition is satisfied:

$18 < WL/P < 28$ where "W" denotes an effective scan width (mm) on the image formation surface, "L" denotes a distance (mm) from the deflecting surface to the molded resin lens, and "P" denotes a distance (mm) from the deflecting surface to the image formation surface.

2. The scanning optical system according to claim 1, wherein:
  the scan lens group includes two or more refractive lenses; and
  the molded resin lens is placed as one of the refractive lenses of the scan lens group closest to the deflecting system.

3. The scanning optical system according to claim 1, wherein the molded resin lens is formed by injection molding using a mold having a gate at a position corresponding to a center of the effective scan width on a surface of the molded resin lens, the beam not regularly passing through the surface of the molded resin lens.

4. The scanning optical system according to claim 1, wherein the diffractive level difference structure has optical properties for correcting chromatic aberration of magnification which is caused by wavelength variation of the beam emitted by the light source.

5. The scanning optical system according to claim 1, wherein the base curve of the diffracting lens surface of the molded resin lens is designed as a rotationally symmetric aspherical surface.

6. The scanning optical system according to claim 1, wherein:
  the scan lens group includes a first refractive lens which is placed on the deflecting system's side and a second refractive lens;
  the molded resin lens is placed as the first refractive lens; and the diffracting lens surface with the diffractive level difference structure is provided to a side of the molded resin lens facing toward the image formation surface.

7. The scanning optical system according to claim 6, wherein:
   a lens surface of the molded resin lens facing toward the deflecting system is formed as a concave spherical surface;
   the base curve of the diffracting lens surface of the molded resin lens facing toward the image formation surface is designed as a convex rotationally symmetric aspherical surface;
   a lens surface of the second refractive lens facing toward the deflecting system is formed as a concave spherical surface; and
   a lens surface of the second refractive lens facing toward the image formation surface is formed as a convex anamorphic aspherical surface.

8. The scanning optical system according to claim 1, wherein the deflecting system is implemented by a polygon mirror.

* * * * *